W. H. TAYLOR.

Assignor to the YALE LOCK MANUFACTURING CO.

Lock.

No. 8,379. Reissued Aug. 20, 1878.

WITNESSES

Wm A Skinkle

Wm T. Kilgore

INVENTOR

Warren. H. Taylor.

By his Attorneys

Baldwin, Hopkins, & Peyton

UNITED STATES PATENT OFFICE.

WARREN H. TAYLOR, OF STAMFORD, CONNECTICUT, ASSIGNOR TO THE YALE LOCK MANUFACTURING COMPANY, OF SAME PLACE.

IMPROVEMENT IN LOCKS.

Specification forming part of Letters Patent No. 172,899, dated February 1, 1876; Reissue No. 8,379, dated August 20, 1878; application filed July 18, 1878.

*To all whom it may concern:*

Be it known that I, WARREN H. TAYLOR, of Stamford, in the county of Fairfield and State of Connecticut, have invented certain new and useful Improvements in Locks for Drawers; and I do hereby declare that the following is a full, clear, and exact description thereof, that will enable others skilled in the art to which it appertains to make and use the same, reference being had to the accompanying drawings, and to the letters of reference marked thereon, which form a part of this specification.

My invention relates to that class of drawer or cabinet locks operated by rotating plate or sheet-metal keys, and provided with outwardly-projecting nosings.

Heretofore locks of this kind have had their nosings formed of a stationary barrel projecting from the lock-case, and containing a solid rotary cylindrical key-hub with a longitudinal radial key-slot cutting its periphery on one side. There are two serious objections to this construction of a nosing, which it is the purpose of my invention to obviate. First, the use of the key-hub involves, in the manufacture of the vast number of these locks necessary to supply the continual demand for them, a very considerable loss of metal, representing a material additional per cent. of cost of manufacture. Second, as the key-slot in the hub must be of the width of the key, and yet of a width less than the diameter of the hub, it follows of necessity that a larger barrel must be used than is required to merely receive the key. Hence it is my plan to dispense with the hub altogether, thus saving its cost, and enabling me to reduce the diameter of my nosing or key-barrel to the minimum dimension that will receive the key, thereby effecting a still further saving of stock and diminution of cost of production. In place of the old slotted rotary hub within the barrel I employ a rotary guideway at one point and a suitable key-bearing, to limit the thrust of the key, at another, the inner surface of the barrel itself serving to guide the key longitudinally during its insertion and as a side bearing during its revolution to cast the bolt. As a further beneficial result of this construction, I am enabled to make my lock wholly of drawn or rolled stock, and to use a flat key, bitted alike on both sides, so that it may be inserted and operated equally well either side up.

Figure 1:
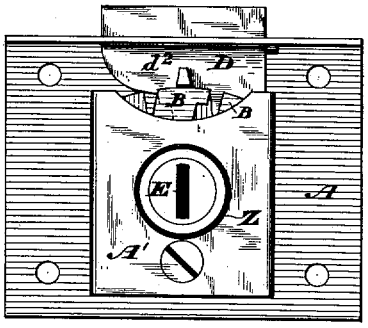
Figure 2:
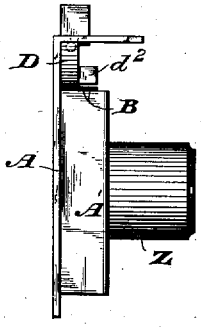
Figure 3:
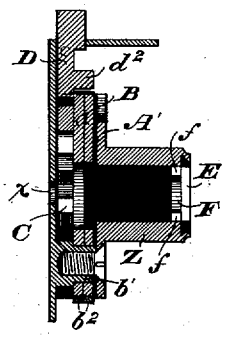
Figure 9:
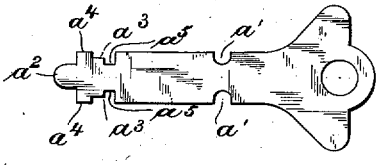

In the accompanying drawings, illustrating my invention, Figure 1 is a front elevation. Fig. 2 is an end elevation, and Fig. 3 a vertical section. Figs. 4 to 8 are details of the same, and Fig. 9 represents the key, which has no cylindrical spindle, but, as illustrated, has an end pintle, $a^2$, guide-notches $a^1$, bits $a^3$ and $a^5$, and wings $a^4$, the bittings and notches and wings of its two edges being exactly alike.

Figure 7:
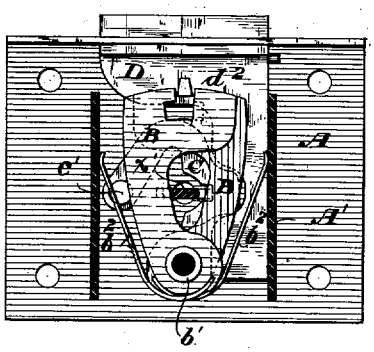
Figure 6:
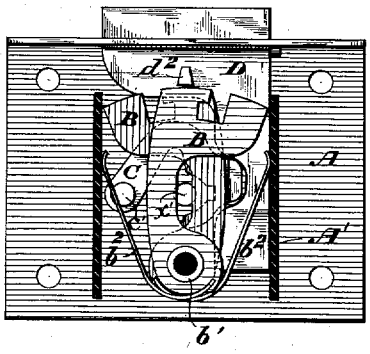
Figure 4:
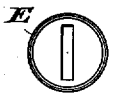
Figure 5:
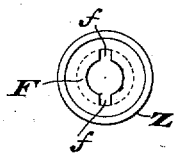
Figure 8:
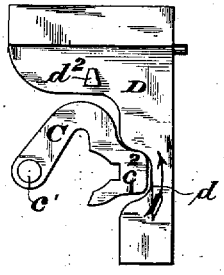

Referring to the lock, A indicates the back plate, and A′ the cap. B B indicate double tumblers vibrating in opposite directions, and pivoted upon one fixed center, $b^1$, and $b^2$ $b^2$ incate the usual tumbler-springs. C, Fig. 8, indicates the talon-lever, which turns on a stationary pivot, $c^1$, the free or vibratory end $c^2$ of which fits into the talon $d$ of the bolt D, the inwardly-curved edge of the lever end $c^2$ forming the intermediate talon against which the key-wing $a^4$ strikes, throwing the bolt the full distance. The bolt D has the usual fence $d^2$ for engagement with the tumblers. Fig. 6 represents the double tumblers closed, and Fig. 7 represents them fully open. E, Fig. 3, indicates a rotary guide within the barrel Z. Through this rotary guide (shown in elevation, Fig. 4) is the key-slot corresponding to the greatest section of the key-blade.

Back of the rotary guide is a ledge, F. (Shown in elevation in Fig. 5.) The key is made of a width corresponding to the inside diameter of the barrel, and, in order that it may pass the ledge and thus connect with the working parts of the lock, it is necessary to cut two notches, $f$ $f$, in the ledge, and, that the key may revolve after it is thus inserted, it is necessary that the two notches $a^1$ be cut on its edges at points which, when the key is inserted the proper distance, will coincide with the notches in the ledge.

In all locks of this class there must be provided at some point a bearing or stop to limit the thrust of the key, against which it can be pressed and turned. In my lock this bearing is the back plate, which serves as the key-end bearing, while the key-barrel serves as the key-side bearing. These, like the rotary guide and slotted ledge, are essential elements. I have provided, as illustrated in the drawings, the key-pintle $a^2$ and the pintle-hole $x$, which, however, have practically no function in the operation of the key, but do no harm, and are simply indifferent features.

The operation of the parts described is as follows: The key, being passed, either side up, through the rotary guide E and through the slots $f$ of the ledge F, is guided into position by these parts, aided by the inner surface of the barrel Z, between the tumblers, against the back plate, and into the pintle-hole $x$. The notches $a^1$ $a^1$ then coinciding with the ledge, the key can be turned a half-revolution either way for locking or unlocking, and during such half-revolution the ledge enters and engages in the notches $a^1$, and prevents the withdrawal of the key until its edges again coincide with the notches in the ledge, when the bolt will always be in the locked or unlocked position. In the act of locking, the key, on being turned a quarter-revolution in the direction of the arrow, Fig. 8, reaches the position there shown. At this point one of the bits $a^3$ and one of the bits $a^5$ fully open the tumblers, and the fence $d^2$ can escape, as illustrated in Fig. 7. Simultaneously with the said quarter-turn of the key one of its wings $a^4$, by impact upon the talon-lever C, has carried the bolt forward to the half-thrown position shown in Figs. 7 and 8. In the succeeding quarter-turn the key comes into position for withdrawal—that is, the edges of the key coincide with the notches in the ledge, as in Fig. 6, leaving the tumblers closed behind the fence $d^2$ and the bolt D locked, as in Fig. 1. The half-revolution of the key in the opposite direction effects the aforesaid movements in reverse order for unlocking.

Having described my invention, what I claim as new, and desire to secure by Letters Patent, is as follows, viz:

1. In a lock, a keyway having at one end a rotary guide and at the other end a fixed bearing in line therewith, whereby a flat or plate key may be adjusted in place and turned without the aid of a circular spindle of its own, and without the aid of a solid cylindrical key-hub to turn with it, substantially as described.

2. In a lock constructed for a flat or plate key, the combination of a rotary guide at one end of the keyway of said lock, a stationary bearing at the other end, and between the said guide and bearing a fixed longitudinal key-guide, substantially as described.

3. In a lock constructed for a flat or plate key, a vibrating talon, its inner curved edge being the talon for the key-bit, and its outer or free end fitted into the bolt-talon and actuating the bolt, substantially as described.

4. In the keyway of a lock constructed for a flat or plate key, the combination of a rotating guide and a fixed key-end bearing, both of which support the key during its rotation to operate the lock, and back of the rotary guide a ledge, slotted at two opposite points, which prevents the insertion or withdrawal of the key except when the lock is either in the locked or unlocked position, substantially as described.

5. In a lock, the combination of a rotary key-guide within a nosing, a ledge, notched or slotted at two opposite points for retaining the key in position while operating the lock, and vibrating tumblers adapted to be set by a flat key bitted alike on its two edges, substantially as described.

6. In a lock, the combination of a flat or sheet-metal key bitted alike on its two edges, a ledge within a keyway slotted at two opposite points, for preventing the insertion or withdrawal of the key except when the lock is in the locked or unlocked position, and vibrating tumblers adapted to be set by either side of said key.

7. In a lock, the combination of a flat or sheet-metal key, a longitudinal guide to direct the key during its insertion in the lock, a rotary guide to support the key during its rotation to operate the lock, a ledge slotted at two opposite points to prevent the insertion and withdrawal of the key except at the locked and unlocked positions, a key-end bearing, and vibrating tumblers adapted to be set by either side of the key, substantially as described.

8. The combination of a hollow longitudinal key guide or barrel and a flat or sheet-metal key, rotating centrally on the axial line of the barrel, and bitted upon its two edges, with vibrating tumblers, the whole being so arranged that when the key is inserted in the barrel and turned each of its bitted edges may set different tumblers, substantially as described.

9. In a lock, the combination of a bolt and a flat or sheet-metal key either side of which is adapted to engage with the talon for throwing the bolt, but only one side of which can act upon the talon at once, substantially as described.

10. A centrally-rotating flat or sheet-metal key without a circular spindle, but having a bearing to limit its thrust, and bitted upon its two edges, and also provided with notches or slots on its two edges for retaining it in position while operating the lock, substantially as described.

In testimony that I claim the foregoing I have hereunto set my hand this 12th day of July, 1878.

WARREN H. TAYLOR.

Witnesses:

E. D. OGDEN, Jr.,

SCHUYLER MERRITT.